(12) United States Patent
Guerinon et al.

(10) Patent No.: US 7,469,733 B2
(45) Date of Patent: Dec. 30, 2008

(54) EXTENDED MOBILITY TIRE WITH ASYMMETRICALLY ARRANGED BEADS

(75) Inventors: Bernard Guerinon, Clermont-Ferrand (FR); James Robert Anderson, Simpsonville, SC (US); David Jardine, Clermont-Ferrand (FR); Jean-Jacques Drieux, Volvic (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 255 days.

(21) Appl. No.: 11/376,165

(22) Filed: Mar. 16, 2006

(65) Prior Publication Data

US 2006/0254690 A1    Nov. 16, 2006

Related U.S. Application Data

(63) Continuation of application No. PCT/EP2004/010067, filed on Sep. 9, 2004.

(30) Foreign Application Priority Data

Sep. 18, 2003    (FR) ................................ 03 10990

(51) Int. Cl.
*B60C 3/06* (2006.01)
*B60C 15/00* (2006.01)

(52) U.S. Cl. ................. 152/454; 152/455; 152/539

(58) Field of Classification Search ................. 152/454, 152/455

See application file for complete search history.

(56) References Cited

U.S. PATENT DOCUMENTS

| 5,634,993 | A | 6/1997 | Drieux et al. |
|---|---|---|---|
| 5,971,047 | A | 10/1999 | Drieux et al. |
| 6,314,375 | B1 | 11/2001 | Sasaki et al. |
| 6,357,502 | B1 * | 3/2002 | Caretta ........................ 152/454 |
| 2002/0179216 | A1 | 12/2002 | Pereira et al. |

FOREIGN PATENT DOCUMENTS

| EP | 1002667 | * | 5/2000 |
|---|---|---|---|
| WO | WO 01/39999 | | 6/2001 |

* cited by examiner

*Primary Examiner*—Justin Fischer
(74) *Attorney, Agent, or Firm*—Buchanan Ingersoll & Rooney PC

(57) ABSTRACT

A tyre for a vehicle wheel comprising two sidewalls, a tread, beads, the sidewall intended to be positioned on the interior side of the vehicle being shorter than that intended to be positioned on the exterior side of the vehicle, a reinforcement structure extending between the beads and maintained in said beads by anchoring zones, each of the beads comprising a specific and distinct arrangement of the anchoring zone thereof, such that the anchoring zone of the bead intended to be positioned on the exterior side of the vehicle exhibits a greater anchoring capacity than the anchoring zone of the bead intended to be on the interior side of the vehicle. The internal and external anchoring zones are thus arranged in such a manner as to produce, in operation, a rim clamping load which is substantially identical on each side.

7 Claims, 10 Drawing Sheets

EXTENDED MOBILITY TIRE WITH ASYMMETRICALLY ARRANGED BEADS

This application is a continuation of International Application PCT/EP2004/010067 filed on Sep. 9, 2004, and which published as WO 2005/025896 on Mar. 24, 2005.

BACKGROUND

The present invention relates to a tyre for a vehicle wheel in which at least one of the beads comprises a seat having a generatrix, the axially inner end of which lies on a circle of diameter greater than the diameter of the circle on which the axially outer end is located, sidewalls of unequal heights and specific anchoring zones for each of the sidewalls. This type of design is particularly suited to the new generations of tyres which can be used, within certain limits, in conditions of low pressure, or even zero or virtually zero pressure, with the risk of separation of the tyre from the rim on which it is fitted being reduced. This concept is frequently designated by the expression "extended mobility".

For a long time, tyre manufacturers have been trying to develop a tyre which does not create any source of potential risk or danger in the event of an abnormal drop in, or even total loss of, pressure. One of the difficulties encountered relates to travelling with a flat tyre or at very low pressure. In fact, when travelling at very low pressure, or even at zero pressure, with conventional tyres, the beads are at great risk of separating from the periphery of the rim against which they were held by the pressure.

Numerous solutions have been tested in order to overcome these disadvantages. Frequently, these solutions cause additional difficulties in fitting and removing the tyre to/from the rim.

Furthermore, the tyre clamping function onto the rim is an essential function for ensuring the behaviour of the tyre in operation. In fact, this function bears directly or indirectly on numerous aspects such as fitting (sometimes known as "clipping") or fastening of the tyre, the tightness of the tyre, rotation on the rim etc. These functions are all critical and require specific characteristics and rigorous manufacture of the products, in particular if high standards of quality are desired. Outside, the rims and tyres of the same code are often of slightly different dimensions, primarily due to manufacturing tolerances. These dimensional variations make it more difficult to comply with the various functions listed above.

Two major types of solution are used industrially to fulfil these functions. Firstly, for traditional tyres, it is the bead wire which performs all these functions simultaneously.

More recently, in various types of product manufactured by the Applicant, the conventional bead wire is replaced by an anchoring zone in particular comprising arrangements of circumferential cords which cooperate with the carcass-type reinforcement structure via an anchoring or bonding compound. Here too, the anchoring zone performs all the above-stated functions.

However, in both these cases, it is difficult to optimise certain parameters because, very often, improvement in one parameter causes another to deteriorate. There are thus certain limits to making such compromises between a gain on one hand and a loss on another, since it is often difficult to tolerate poorer performance for certain aspects.

EP 0 582 196 discloses a tyre comprising a tread extended by two sidewalls and two beads and also a carcass anchored in the two beads to an annular reinforcement. The carcass is formed of adjacently arranged cords which are aligned circumferentially and are in contact with at least one layer of bonding rubber of very high elasticity modulus in the hooking zone of the bead comprising the annular reinforcement. In this tyre, the annular reinforcement of the hooking zone of the bead is formed of stacks of circumferential cords with interposition of a layer of bonding rubber of very high elasticity modulus between the reinforcement cords of the carcass and these stacks. This embodiment is intended for tyres of conventional type, with the beads being held against the rim hook due to the inflation pressure of the tyre. In this type of arrangement, there is a predominance of stresses of the lateral or axial type, which induces major compressive forces which act substantially axially from the sidewalls towards the centre of said bead. These forces increase according to the inflation pressure. The increase in pressure tends to make the bead slide against the hook, radially towards the outside. The stresses induced radially towards the inside, against the seat of the rim, decrease with the increase in pressure, or with any increase in the tension of the carcass-type reinforcement structure.

It will furthermore be noted that the stacks of cords are aligned in a direction substantially parallel to the orientation of the profile of the rim hook against which the bead bears. The profile of the bead of this type of tyre is relatively narrow and elongated; the anchoring is distributed over the major part of the height and width of the bead. The passage of the carcass into the bead is generally substantially central relative to the walls of said bead. Furthermore, when it is a relatively narrow bead subject to predominantly axial stresses, neither the inflation pressure nor the tension induced in the carcass permits generation of large moments or torques, which tend to make the bead pivot or turn on itself.

With such a type of tyre, if the pressure drops and the vehicle continues to travel, retention of the tyre on the rim is no longer ensured, and in the majority of cases unwedging occurs.

EP 0 673 324 describes a rolling assembly comprising at least one tyre with a radial carcass reinforcement which is anchored within each bead and a rim of specific shaping. This rim comprises a first seat with a generatrix such that the axially outer end of said generatrix is distant from the axis of rotation by a length less than the distance between its axially inner end and is defined axially to the outside by a protrusion or rim flange. The tyre comprises bead seats suitable for fitting on this rim. The type of tyre/rim interface proposed in this document has many advantages compared with the solutions already known, in particular with regard to the ease of fitting/removal, while making it possible to travel a certain distance despite a drop in pressure.

EP 0 748 287 describes a solution which permits initial optimisation of the basic technology described in EP 0 673 324 referred to above. This is a tyre, at least one bead of which has a structure which makes it possible to modify the clamping of said bead according to the tension of the carcass reinforcement and in particular reinforcement thereof when the inflation pressure increases to its rated value. The document thus proposes using a bead with anchoring of the end of the carcass by turning it up about the base of the bead wire, via the axially and radially inner sides relative to the bead wire. The bead also comprises, adjacent to the bead wire and axially to the outside thereof, a profiled element of rubber compound of relatively high hardness against which the bead wire can exert a compressive force when the tension of the carcass reinforcement increases. This compressive force creates self-clamping of the toe of the bead on the fitting rim. The tension of the carcass therefore involves displacement of the bead wire towards the outside, so that the latter generates said compressive force. In such a configuration, the presence of a bead wire of conventional type and the turning-up of the carcass beneath the latter are presented as being indispensable for generating the compressive force. This restricts the other types of arrangement which can be considered Moreover, EP 0 922 592 describes two embodiments with the carcass anchored by turning it up axially towards the outside. The first embodiment proposes anchoring of the carcass in the bead by turning it up radially towards the outside of the end of the carcass. The upturn is surrounded on either side by two radially superposed layers of metal wires arranged axially side by side and covering substantially all the axial portion along the seat of the bead. The layers are arranged so as to be parallel to the seat. The types of cords and the corresponding dimensions are very precise. The second solution proposed in this document relates to bead seats with different diameters. Securing of the carcass is also effected differently from the first solution. First of all, the carcass is subdivided into two portions which are radially separated at the level of the bead. Each portion is adjoined by a layer of cords which is arranged radially, each layer being arranged radially to the outside against each of the carcass portions. The radially outer carcass portion and the layer of cords radially to the inside are separated by an insert of the type of elastomer of high hardness provided in the bead. This insert axially lines the central portion of the bead and rises radially towards the outside and axially towards the inside, beyond the radial limit of the presence of the metal wires.

The two examples of solutions of EP 0 922 592 have several disadvantages. Thus, the securing of the carcass proposed in this document requires the presence of an upturn axially towards the outside of the end portion of the carcass. Furthermore, the superposed layers of cords are arranged radially close to the seat of the bead, for a good part at a radial position closer to the axis of rotation than the upper portion of the flange on which the bead bears. Unless highly extensible cords are used, it is difficult to fit/remove the tyre, due to the unfavourable radial position of the cords. It will also be noted that the stacks are oriented substantially parallel to the profile of the seat against which the bead bears. According to the second solution, the carcass is subdivided into two portions and an insert of high hardness is necessary to separate on one hand the layers of cords and on the other hand the two carcass portions. However, the carcass is not anchored in the insert. The form of the insert described is limitative.

Document WO 01/39999 describes a tyre with extended mobility, each of the beads of which comprises an inverted seat, an anchoring zone, a bearing zone and a transition zone. Each of the zones taken in isolation and also all the zones together to some extent form an internal bead capable of effecting relative movements, such as, for example, of the angular or rotational type, relative to another zone, or relative to a virtual centre of pressure CP, or relative to the seat of the rim, etc.

Preferably, said bearing zone is substantially elongated. It is extended, for example, substantially along the seat of the bead. The transfer of forces upon rotation of the bottom zone of the axially inner portion towards the axially outer portion is thus possible, while maintaining bearing pressure against at least a portion of the seat of the bead. The transfer of forces creates self-clamping of the toe of the bead against the rim.

As a general rule, tyres comprise architectural elements which are of symmetrical design, i.e. similar on the two sidewalls. This type of design is so widespread that it has become natural for the person skilled in the art to design tyres in accordance with such principles. However, directly applying such principles to intrinsically asymmetrical products may result in certain technical limitations or difficulties. For example, in the case of tyres provided with sidewalls of unequal heights and inverted bead seats, the stresses generated at the level of each of the beads may vary considerably. Thus, if the external sidewall is relatively tall relative to the internal sidewall of the wheel, substantially higher stresses must be withstood. Furthermore, the bead and sidewall on the exterior side of the vehicle are more exposed to the hazards of the road and the various stresses and strains which may result. These various stresses often require designers to provide multiple reinforcement and/or anchoring and/or protective elements so that the demanding conditions associated with positioning on the exterior side of the wheel can effectively be withstood. The resulting architectural elements have a significant impact in terms of weight, cost, space, difficulty and/or length of manufacture, additional materials etc. Duplicating the architecture of the external bead, said architecture being established as a function of the limit stresses for this side of the wheel, in order to obtain a bead similar on the interior side, correspondingly amplifies these various consequences.

Furthermore, many products comprise an external bead which is larger in size or surface area than the internal bead. For example, the external bead may require zones to provide protection from the effects of the external environment. In those cases in which the surface area occupied by the interior side bead is smaller than that on the exterior side, directly transposing an architecture which has been established as a function of an external bead may prove difficult or even impossible due to lack of space in the internal bead.

SUMMARY

The aim of the present invention is to remedy these various drawbacks. To do this, it provides a tyre for a vehicle wheel, comprising:
two sidewalls spaced apart axially from each other, joined at their radially outer portions by a crown zone provided on its radially outer portion with a circumferential tread;
beads, arranged radially to the inside of each of the sidewalls, each bead comprising a seat and an outer flange which are intended to come into contact with a suitable rim;
a reinforcement structure extending substantially radially from each of the beads, along the sidewalls, towards the crown zone;
said beads comprising:
a bead seat comprising a generatrix, the axially inner end of which lies on a circle of diameter greater than the diameter of the circle on which the axially outer end is located;
an anchoring zone for the reinforcement structure in said bead, comprising an arrangement of circumferential cords disposed substantially adjacently to a portion of the reinforcement structure and comprising at least two stacks distributed on either side of the reinforcement structure, a bonding compound being provided between the circumferential cords and the reinforcement structure;
a bearing zone for said bead extending substantially along the seat of the latter;
each of the beads comprises a specific and distinct arrangement of the anchoring zone thereof, such that the anchoring zone of the bead of the longer sidewall exhibits a greater anchoring capacity than the anchoring zone of the bead of the shorter sidewall.

Anchoring capacity (also known as "anchoring force" or "retention force") is understood to mean the capacity of the anchoring zone favourably and durably to maintain anchoring of the carcass-type reinforcement structure in said zone, once said structure is subjected to mechanical, in particular tensile, stresses within predetermined limits.

It is then possible to design a shorter sidewall bead which is, for example, simpler, lighter, more compact, more flexible, simpler to manufacture, less costly etc. Cost advantages are achieved because the use of materials which would be virtually useless and, to a certain extent, would involve weight penalties, is avoided. Furthermore, the shorter sidewall retains favourable fitting/removal characteristics. Furthermore, the longer sidewall, often disposed on the outer side of the vehicle, generally exhibits greater resistance to mechanical stresses than does the bead on the internal side.

Similarly, the longer sidewall bead can be designed without worrying that the additional elements will have a negative impact on the shorter sidewall bead, which would not necessarily require said additional elements. For certain applications in which the limit conditions are extreme, this may make it possible to design a suitable and efficient product which it would have been difficult to produce with two identical anchoring zones, for example due to lack of space in the shorter sidewall bead.

A tyre according to the invention is particularly advantageous for certain types of high-technology products and/or products having tall sidewalls, such as, for example, SUV (Sport Utility Vehicle) tyres.

According to one advantageous embodiment of the invention, both anchoring zones are arranged in such a manner as to produce a rim clamping load which is substantially identical on each side when the tyre is fitted on an appropriate rim and pressurised to a pressure substantially corresponding to its operating pressure.

Tyre operation is then more uniform, in particular in the bead zone. The uniformity of the distribution of loads is vital to ensuring both operating properties, such as ease of fitting/removal, and intrinsic properties, such as durability or endurance.

At operating pressure, the type of tyre according to the invention, comprising sidewalls of unequal heights, exhibits differing levels of tension in the cords of the reinforcement structure. Cord tension is, in fact, higher on the longer sidewall side than on the shorter sidewall side. In such a case, typical solutions involving the provision of identical anchoring zones in both beads would bring about a higher clamping force on the shorter sidewall side. In fact, given that the principal functions of the anchoring are, on the one hand, to absorb the tension in the reinforcement structures and, on the other, to clamp the beads against the rim on which the tyre is fitted, if the levels of tension in the reinforcement cords differ from one side to the other, the anchoring capacities must also differ if it is desired to avoid differing levels of clamping from one bead to the other. Thus, according to one preferred embodiment, the difference in anchoring capacity or force between the two beads substantially corresponds to the difference between the levels of tension in the reinforcement cords in one side relative to the other or in one sidewall relative to the other. In this manner, a higher level of clamping on the side of the tyre with the lowest sidewall height is avoided.

Such a configuration furthermore makes it possible to achieve an ideal distribution of loads at the level of the anchoring zone, in particular in the arrangement of circumferential cords. Major differences in both the nature and the level of stresses to which the various cords in the arrangement are subjected are, for example, avoided, some cords for example being subjected to tensile loads, while others are subjected to compressive loads.

According to one advantageous variant embodiment according to the invention, at pressures within a range from substantially zero to a normal operating pressure, the distribution of pressure along the bearing zone is substantially independent of said pressure value. Upon inflation of the tyre, any effects generated on the distribution of loads along the interface between the bearing zone and the seat of the rim have no major impact on said distribution. Dynamic stability is achieved, which makes it more readily possible to ensure good clamping on the rim, whatever the condition and independently of tolerances. Internal stresses, in particular at the level of the tyre bead, are dynamically stable, so contributing to the product's extended service life. Said dynamic stability also makes it possible to avoid the occurrence of parasitic stresses at the level of the bead, such as, for example stresses likely to affect product properties and qualities. Furthermore, sensitivity is reduced to variations in tolerances in the rim/tyre assembly.

Advantageously, an external lateral zone is disposed in the zones of bead which is intended to be located between the rim flange or hook and the anchoring zone. This zone is preferably furnished with a substantially high modulus rubber compound, for example of between 20 and 60 MPa, or even more.

Advantageously, the external lateral zone is provided in the axially outer portion of the bead and extends between the portion adjacent to the rim hook and the anchoring zone. Advantageously, said zone cooperates with the anchoring zone, which permits a better mechanical action between said anchoring zone and the portion of the bead adjacent to the rim hook.

This zone makes it possible to increase the clamping pressure, in particular in the region of the rim hook. Thanks to the zone's limited deformability, it makes it possible to limit the bead's tendency to slip radially outwards beyond the rim hook. It furthermore contributes, on the one hand, to the inhibition of any tendency to generate a rotational moment and, on the other, to establish dynamic stability, such as for example when cornering or on exposure to major lateral stresses.

According to a preferred embodiment of the invention, each circumferential cord arranged in the bead of the shorter sidewall exhibits a Young's modulus $E_i$ and a surface area $S_i$ and each cord arranged in the bead of the longer sidewall exhibits a Young's modulus $E_e$ and a surface area $S_e$, the cords of said arrangements being disposed such that $\Sigma(E_e \times S_e)_{ext} > \Sigma(E_i \times S_i)_{int}$.

According to this embodiment, the resultant rigidity of the longer sidewall is greater than the resultant rigidity of the shorter sidewall.

The sum of the products of the moduli and the effective surface areas of each of the cords on either side of the reinforcement structure constitutes a reliable, accurate measurement and comparison parameter. Advantageously, this formulation furthermore makes it possible to take account of any type of cord or filament or cable in the comparison. Preferably, the comparison is effected from cords arranged in the bead zone or in the anchoring zone of the reinforcement structure in the bead.

It should be noted that in the case of a multi-filament cable or a cable having multiple cords, the cross-section considered is the effective cross-section. The free or empty spaces between the cords are not taken into consideration.

Advantageously, the sum of the products $E \times S$ is taken into consideration only in the zone of the beads of the tyre. Thus, if for example protective cords, often of textile type, are located in a portion of the sidewall and/or the crown, these cords will not be taken into consideration in the equation.

According to an advantageous variant of the invention, $\Sigma(Ee \times Se)ext/\Sigma(Ei \times Si)int > 1$.

According to various variant embodiments according to the invention, at least one of the characteristics of the circumferential cords of the anchoring zone of the longer sidewall is different relative to the characteristics of the circumferential cords of the anchoring zone of the shorter sidewall. It may be a matter of the type of material, the number of cords or windings, the number of stacks of cords, or various combinations of these variants.

According to an advantageous variant of the invention, the shorter sidewall is intended to be positioned towards the interior side of the vehicle and the longer sidewall is intended to be positioned towards the exterior side of the vehicle.

The anchoring zone does not comprise a bead wire, in particular a bead wire of conventional type, such as, for example, a multi-cord bead wire against which a carcass ply is turned up, such that the cooperation zone between the turned up portion of the ply and the bead wire holds the carcass ply in place.

The reinforcement structure of the sidewalls and the crown is advantageously of the carcass type, its mechanical properties being similar to those of carcass plies of known type. Furthermore, this reinforcement structure is advantageously formed without axial separation at the level of the bead. Thus, all the cords of the circumferential arrangement preferably occupy a substantially identical axial position.

The bearing zone is preferably substantially adjacent to the rim seat.

According to a particularly advantageous method of manufacture in which the various constituents of the tyre are arranged directly on a central core, the shape of which imparts to the tyre during manufacture a substantially similar shape to the shape of the finished product, dispensing with the upturn (which exists with a conventional structure) permits advantageous simplification of manufacture.

According to an advantageous form of embodiment of the invention, the bases of the stacks (the cords radially closest to the axis of rotation of the tyre) are arranged radially farther to the outside than the end of said flange (axially and radially outermost portion of said flange). The bases of the stacks are advantageously provided so as to be arranged radially externally relative to the flange of the rim which is matched to the tyre. Fitting/removal operations of the tyre onto the rim are then facilitated.

Advantageously, the carcass-type reinforcement structure extends substantially radially from each of the beads, along the sidewalls, towards the crown zone. Said structure may thus be unitary and extend from one bead to the other, or alternatively be divided into two half-structures, each extending along a single sidewall.

The number of stacks and the number of windings or turns of each of the stacks is advantageously established according to the characteristics desired for the tyre, for example its operating pressure. For example, a larger number of stacks may be desired in order to increase rigidity at the level of the bead zone.

The reinforcement structure is preferably formed of a cord winding extending back and forth between the two beads, forming loops in each of the beads. Furthermore, the cord winding is preferably formed of a single cord.

DESCRIPTION OF THE DRAWINGS

Other characteristics and advantages of the invention will become apparent on reading the examples of embodiment of the tyre according to the invention, which are given in non-limitative manner, with reference to the appended FIGS. 1 to 10, in which.

DESCRIPTION OF PREFERRED EMBODIMENTS

Figure 1:
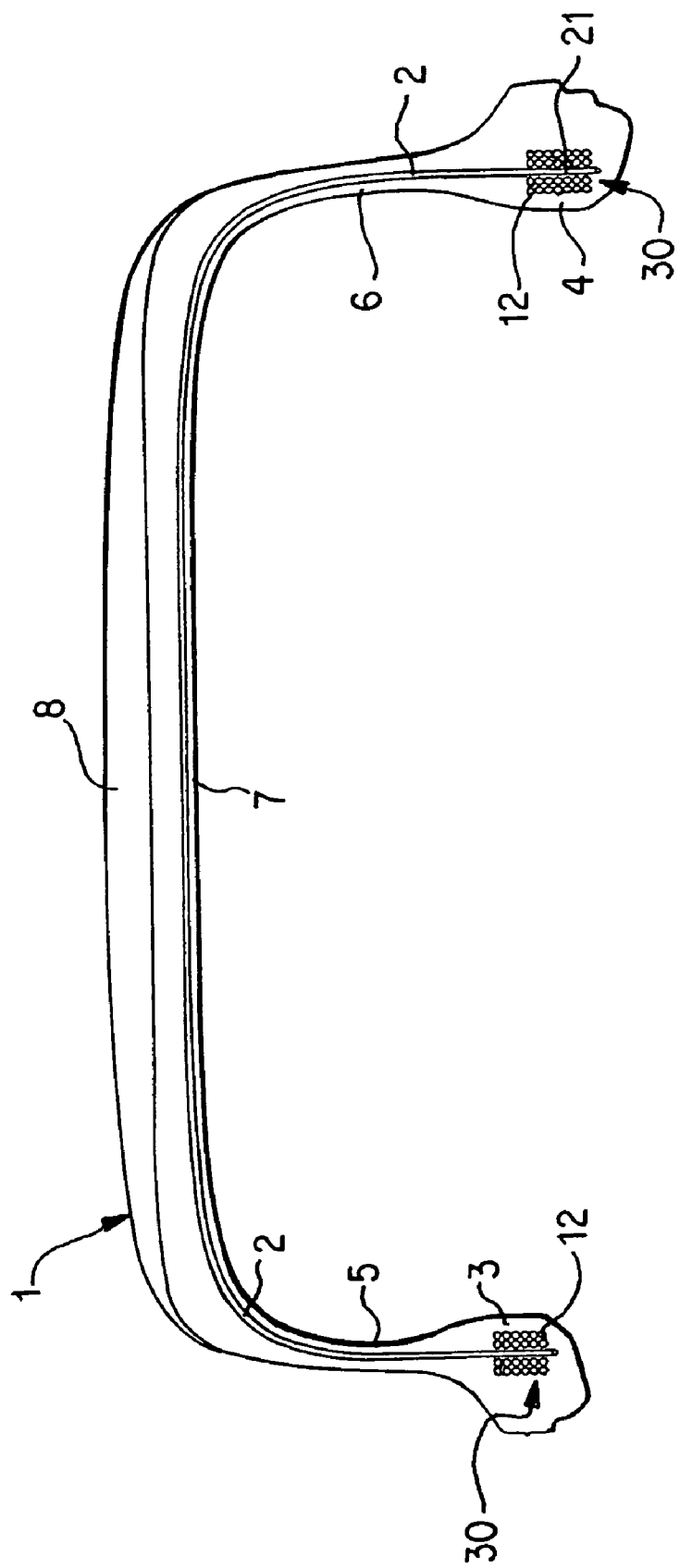
FIG. 1 shows, in cross-section, a tyre according to the invention.

The reinforcement armature or reinforcement of the tyres is at present, and most often, constituted by stacking one or more plies conventionally known as "carcass plies", "crown plies" etc. This method of naming the reinforcement armatures originates from the manufacturing process, which involves producing a series semi-finished products in the form of plies provided with often longitudinal cord reinforcements, said semi-finished products then being assembled or stacked in order to build a tyre blank. The plies are produced flat, with large dimensions, and are subsequently cut according to the dimensions of a given product. The plies are also assembled, in a first phase, substantially flat. The blank thus produced is then shaped to adopt the toroidal profile typical of tyres. The semi-finished products referred to as "finishing" products are then applied to the blank, in order to obtain a product ready for vulcanisation.

Such a "conventional" process in particular involves, especially for the tyre blank manufacturing phase, the use of an anchoring element (generally a bead wire) which is used to anchor or maintain the carcass reinforcement in the tyre bead zone. Thus, in this type of process, a portion of all the plies constituting the carcass reinforcement (or only a part thereof) is turned up around a bead wire arranged in the tyre bead. In this manner, the carcass reinforcement is anchored in the bead.

The general adoption of this type of conventional process in the industry, despite the numerous different ways of producing the plies and assemblies, has led the person skilled in the art to use a vocabulary which reflects this process; hence the generally accepted terminology, comprising in particular the terms "plies", "carcass", "bead wire", "shaping" to designate the change from a flat profile to a toroidal profile, etc.

However, there are nowadays tyres which do not, properly speaking, comprise "plies" or "bead wires" in accordance with the preceding definitions. For example, document EP 0 582 196 describes tyres manufactured without the aid of semi-finished products in the form of plies. For example, the cords of the different reinforcement structures are applied directly to the adjacent layers of rubber compounds, the whole being applied in successive layers on a toroidal core having a shape which makes it possible to obtain directly a profile similar to the final profile of the tyre being manufactured. Thus, in this case, there are no longer any "semi-finished products", nor "plies", nor "bead wires". The base products, such as the rubber compounds and reinforcements in the form of cords or filaments, are applied directly to the core. As this core is of toroidal form, the blank no longer has to be shaped in order to change from a flat profile to a profile in the form of a torus.

Furthermore, the tyres described in this document do not have the conventional upturn of the carcass ply around a bead wire. This type of anchoring is replaced by an arrangement in which circumferential filaments are arranged adjacent to said sidewall reinforcement structure, the whole being embedded in an anchoring or bonding rubber compound.

There are also processes for assembly on a toroidal core using semi-finished products specially adapted for quick, effective and simple laying on a central core. Finally, it is also possible to use a mixed process comprising both certain semi-finished products for producing certain architectural aspects (such as plies, bead wires, etc), whereas others are produced from the direct application of compounds and/or reinforcements in the form of filaments.

In the present document, in order to take into account recent technological developments both in the field of manufacture and in the design of products, the conventional terms such as "plies", "bead wires", etc, are advantageously replaced by neutral terms or terms which are independent of the type of process used. Thus, the term "carcass-type reinforcement" or "sidewall reinforcement" is valid to designate the reinforcement cords of a carcass ply in the conventional process, and the corresponding cords, generally applied at the level of the sidewalls, of a tyre produced in accordance with a process without semi-finished products. The term "anchoring zone", for its part, may equally well designate the traditional upturn of a carcass ply around a bead wire of a conventional process or the assembly formed by the circumferential filaments, the rubber compound and the adjacent sidewall reinforcement portions of a bottom zone produced with a process with application to a toroidal core.

In the present description, the term "cord" very generally designates both monofilaments and multifilaments or assemblies such as cables, plied yarns or alternatively any equivalent type of assembly, whatever the material and the treatment of these cords. This may, for example, involve surface treatments, coating or pre-sizing in order to promote adhesion to the rubber. The expression "unitary cord" designates a cord consisting of a single, unassembled element. The term "multifilament", in contrast, designates an assembly of at least two unitary elements to form a cable, plied yarn, etc.

On the other hand, "radial structure" is understood to mean not only an arrangement at 90 degrees, but also, in accordance with custom, at an angle close to 90°.

It is known that, conventionally, the carcass ply or plies is/are turned up about a bead wire. The bead wire then performs a carcass anchoring function. Thus, in particular, it withstands the tension which develops in the carcass cords, for example under the action of the inflation pressure. The arrangement described in the present document makes it possible to ensure a similar anchoring function. It is also known to use the bead wire of conventional type to perform the function of clamping the bead on a rim. The arrangement described in the present document also makes it possible to ensure a similar clamping function.

In the present description, "bonding" rubber or compound is taken to mean the rubber compound possibly in contact with the reinforcement cords, adhering to the latter and capable of filling the gaps between adjacent cords.

"Contact" between a cord and a layer of bonding rubber is understood to mean the fact that at least part of the outer circumference of the cord is in intimate contact with the rubber compound constituting the bonding rubber.

"Sidewalls" refers to the portions of the tyre, most frequently of low flexural strength, located between the crown and the beads. "Sidewall compound" refers to the rubber compounds located axially to the outside relative to the cords of the reinforcement structure of the carcass and to their bonding rubber. These compounds usually have a low elasticity modulus.

"Bead" refers to the portion of the tyre radially internally adjacent to the sidewall.

"Elasticity modulus" of a rubber compound is understood to mean a secant modulus of extension obtained at a uniaxial deformation of extension of the order of 10% at ambient temperature.

FIG. 1 shows, in cross-section, a tyre 1 according to the invention. This tyre comprises a first sidewall 5 adjacent to a first bead 3 which preferably corresponds to the internal bead. Similarly, the opposite portion of the tyre comprises a second sidewall 6 adjacent to a second bead 4. A crown 7, on which there is provided a tread 8, provides the connection between the sidewalls. The crown preferably comprises at least one reinforcement belt.

The tyre also comprises a reinforcement or reinforcing structure 2 of carcass type provided with reinforcements which are advantageously shaped in a substantially radial arrangement. This structure may be arranged continuously from one bead to the other, passing via the sidewalls and the crown, or alternatively it may comprise two or more parts, arranged for example along the sidewalls, without covering the entire crown.

The end portions 21 of the reinforcement structure 2 are located in the beads, each end portion having axially outer and inner sides 2a, 2b.

The reinforcement structure 2 can be formed by winding a single cord which extends back and forth between the two beads, forming loops in each of the beads. These loops, which are coated in the rubber compound, contribute to the mechanical bond between the reinforcement structure 2 and the bead, in particular the stacks 13. The presence of loops between the "back" and "forth" sections of the cord indicates that the reinforcement is of the monofilament type. Of course, it is possible for the carcass-type reinforcement structure not to be produced in continuous manner from a single cord and it is possible for there not to be any loops, but, for example, free ends.

The bead furthermore comprises an anchoring zone 30 which is substantially circumferential and comprises an arrangement of circumferential cords 12 disposed substantially adjacently to a portion of the reinforcement structure, and the bead comprises at least two stacks 13 distributed on either side of the reinforcement structure, a bonding (or anchoring) compound 14 being arranged between the circumferential cords of the reinforcement structure.

In the anchoring zone, at least one cord 12 of one of the stacks 13 is preferably arranged in the immediate vicinity of a portion 21 of the reinforcement structure 2. The stacks may also be arranged such that a portion 21 is inserted between stacks 13.

In order to promote this anchoring, the space between the cords 12 and the reinforcement structure 2 is occupied by a bonding rubber compound 14. It is also possible to provide for the use of a plurality of compounds having different characteristics, defining a plurality of zones, the combinations of compounds and the resultant arrangements being virtually unlimited. According to various variants, bonding rubber compounds 14 of a wide range of modulus values are used: by way of non-limitative example, the elasticity modulus may be between 10 and 20 MPa, or even higher, such as 40 MPa or above.

The arrangements of cords 11 may be arranged and manufactured in various ways. For example, a stack 13 may advantageously be formed of a single cord 12, wound (substantially at zero degrees) in a spiral, preferably from the smallest diameter towards the largest diameter. A stack may also be formed of a plurality of concentric cords laid one in another.

Figure 2:
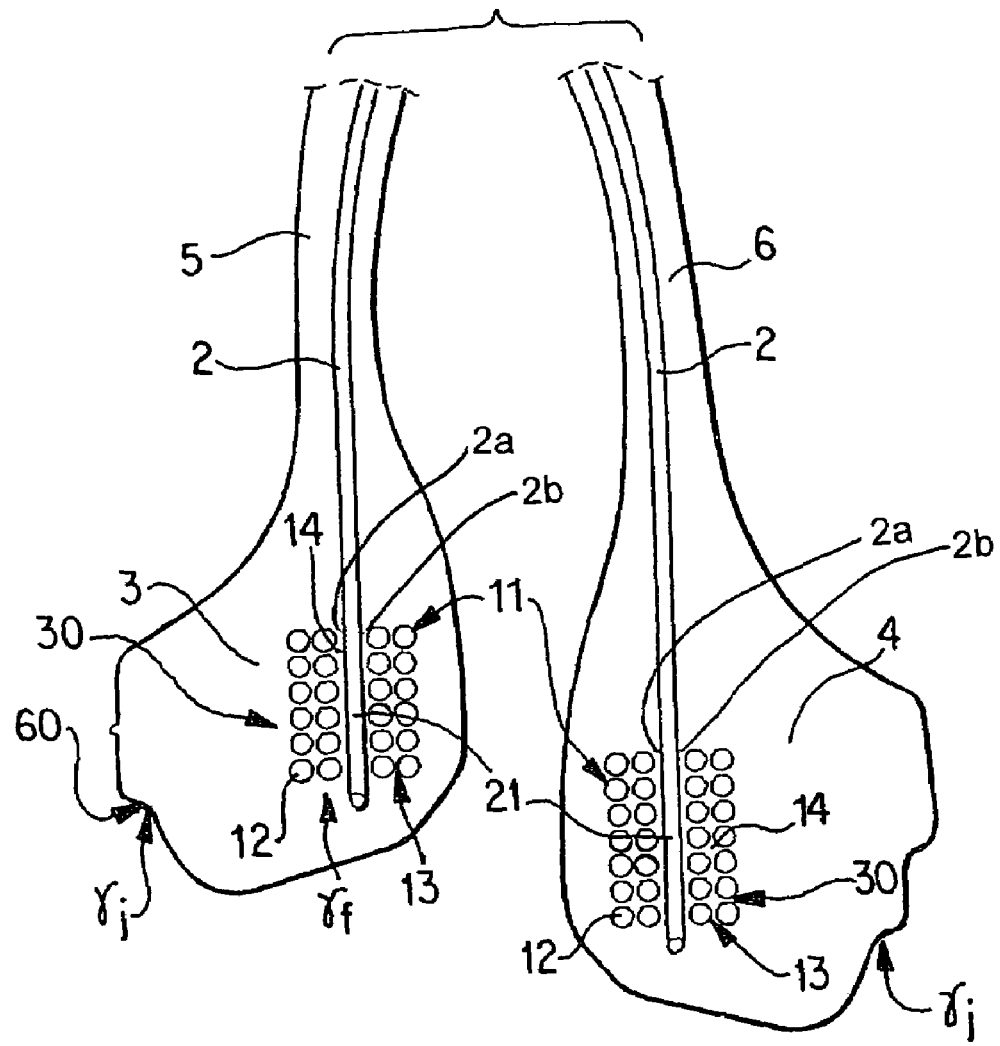
FIG. 2 shows, in an enlarged cross-section, the beads of the example of embodiment of FIG. 1.

According to a first example of embodiment of the invention, shown in FIGS. 1 and 2, the asymmetry of the beads 3 and 4 originates in particular from the fact that the windings or the number of cord turns are not identical in the two beads. By way of example, in the bead 3, the stacks comprise 6 windings (or 6 cords if these only make a single turn), while, in the bead 4, the stacks 13 comprise 7 windings (or 7 cords if these only make a single turn). Obviously, the stacks could also be asymmetrical within a single bead. The differences between the number of windings or cords could, moreover, also be greater. Advantageously, the differences between the stacks of one bead relative to the other fulfil the following relationship: $\Sigma(Ee \times Se)ext > \Sigma(Ei \times Si)int$, in which $Ei$ represents the Young's modulus of the circumferential cords arranged in the bead of the axially inner side of the tyre or of the shorter sidewall; $Si$ represents the surface area of the cords arranged in the bead of the axially inner side of the tyre or of the shorter sidewall; $Ee$ represents the Young's modulus of the circumferential cords arranged in the bead of the axially outer side of the tyre or of the longer sidewall; $Se$ represents the surface area of the cords arranged in the bead of the axially outer side of the tyre or of the longer sidewall. In this manner, the resultant rigidity of the longer sidewall, preferably on the outer side, is greater than the resultant rigidity of the shorter sidewall, preferably on the inner side, so bringing about a greater anchoring capacity or force on the external side than on the internal side.

Figure 3:
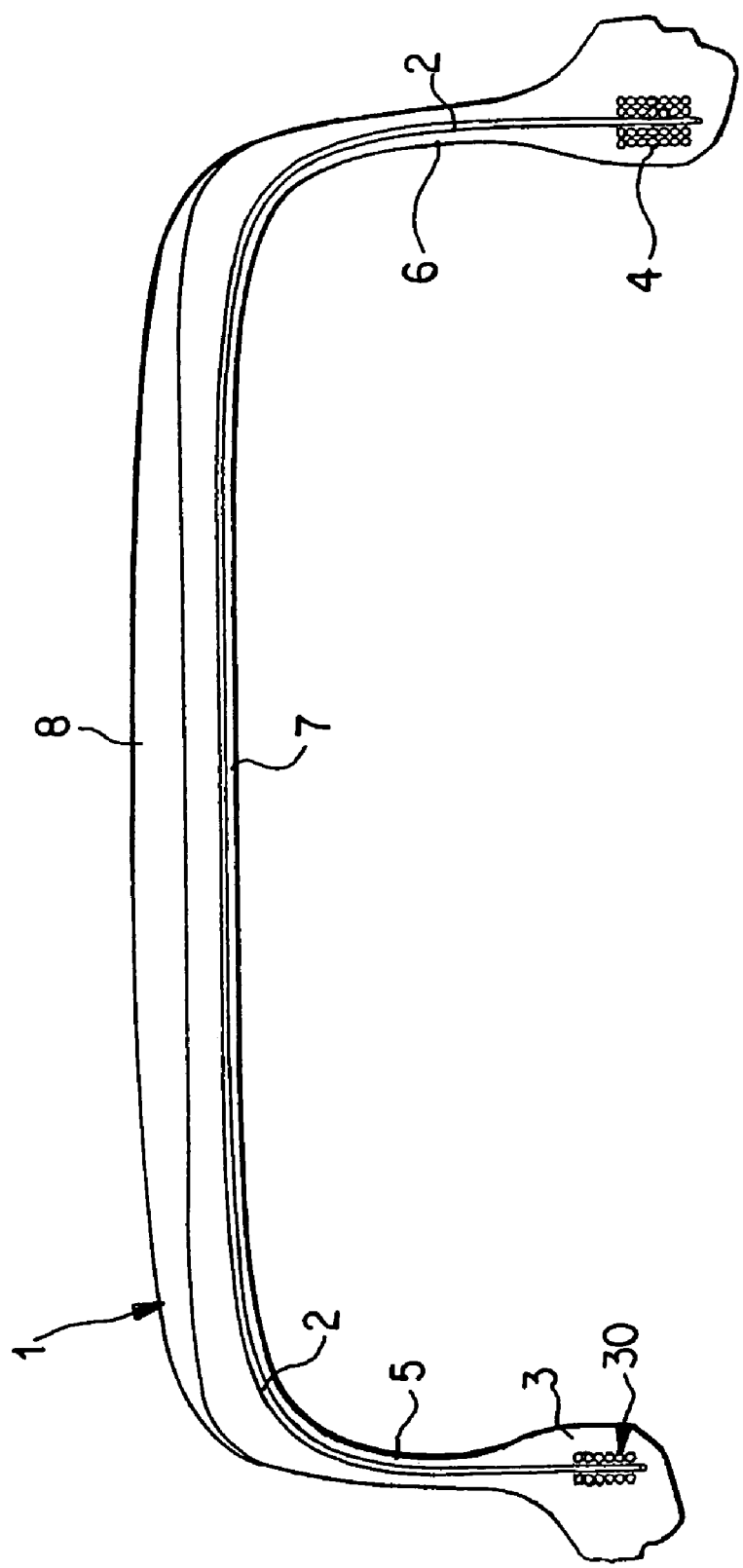
FIG. 3 shows, in cross-section, another example of embodiment of a tyre according to the invention.
Figure 4:
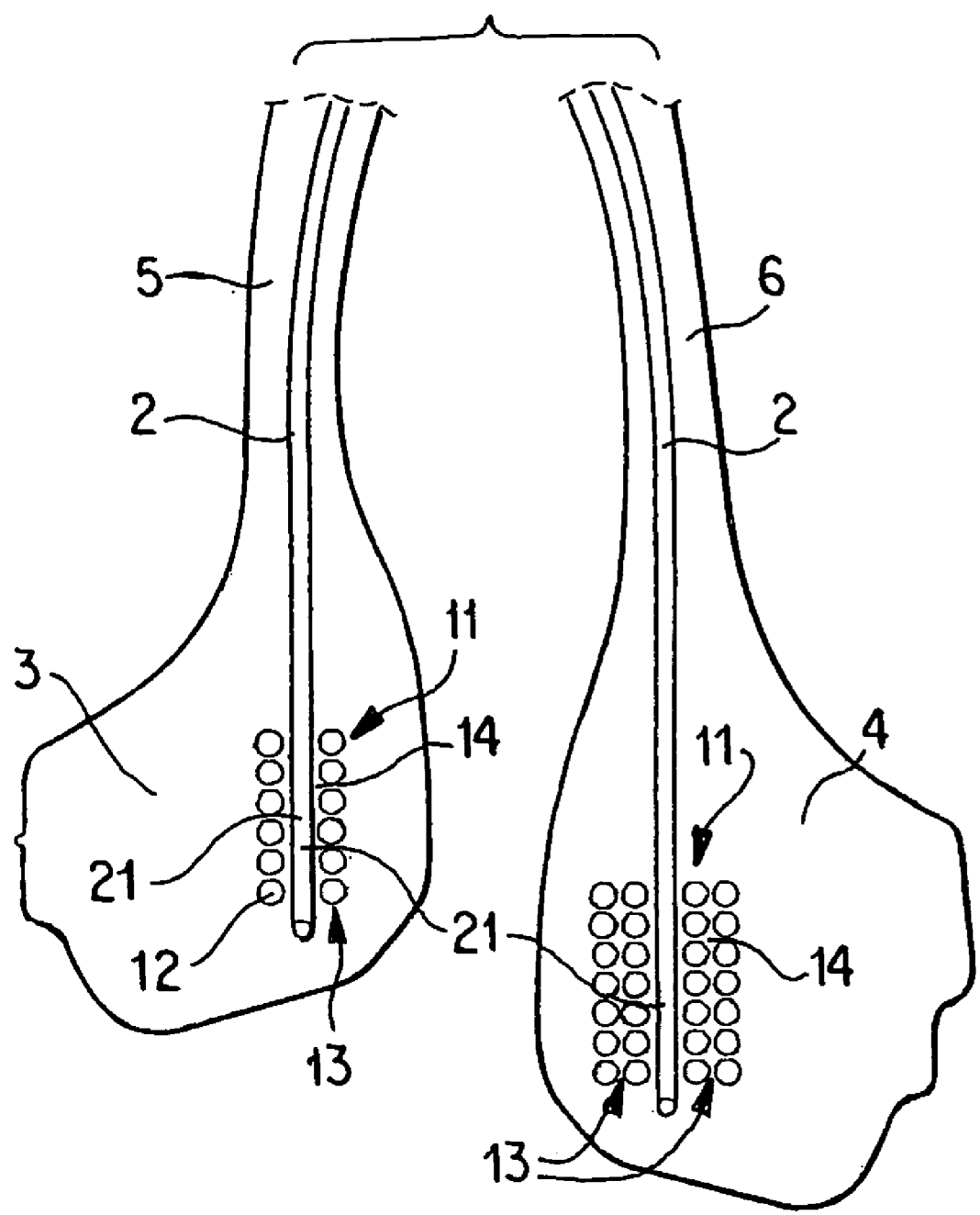
FIG. 4 shows, in an enlarged cross-section, the beads of the example of embodiment of FIG. 3.
Figure 5:
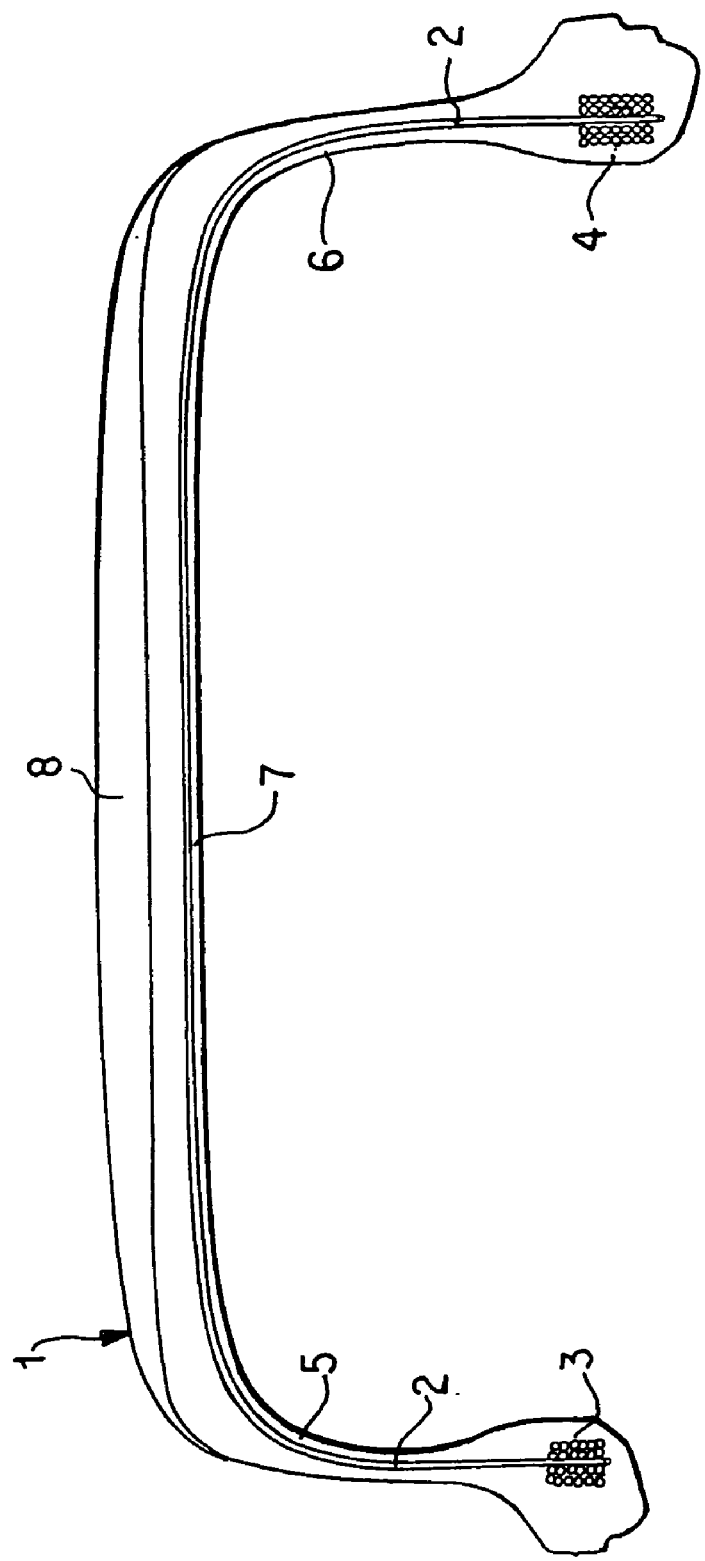
FIG. 5 shows, in cross-section, another example of embodiment of a tyre according to the invention.
Figure 6:
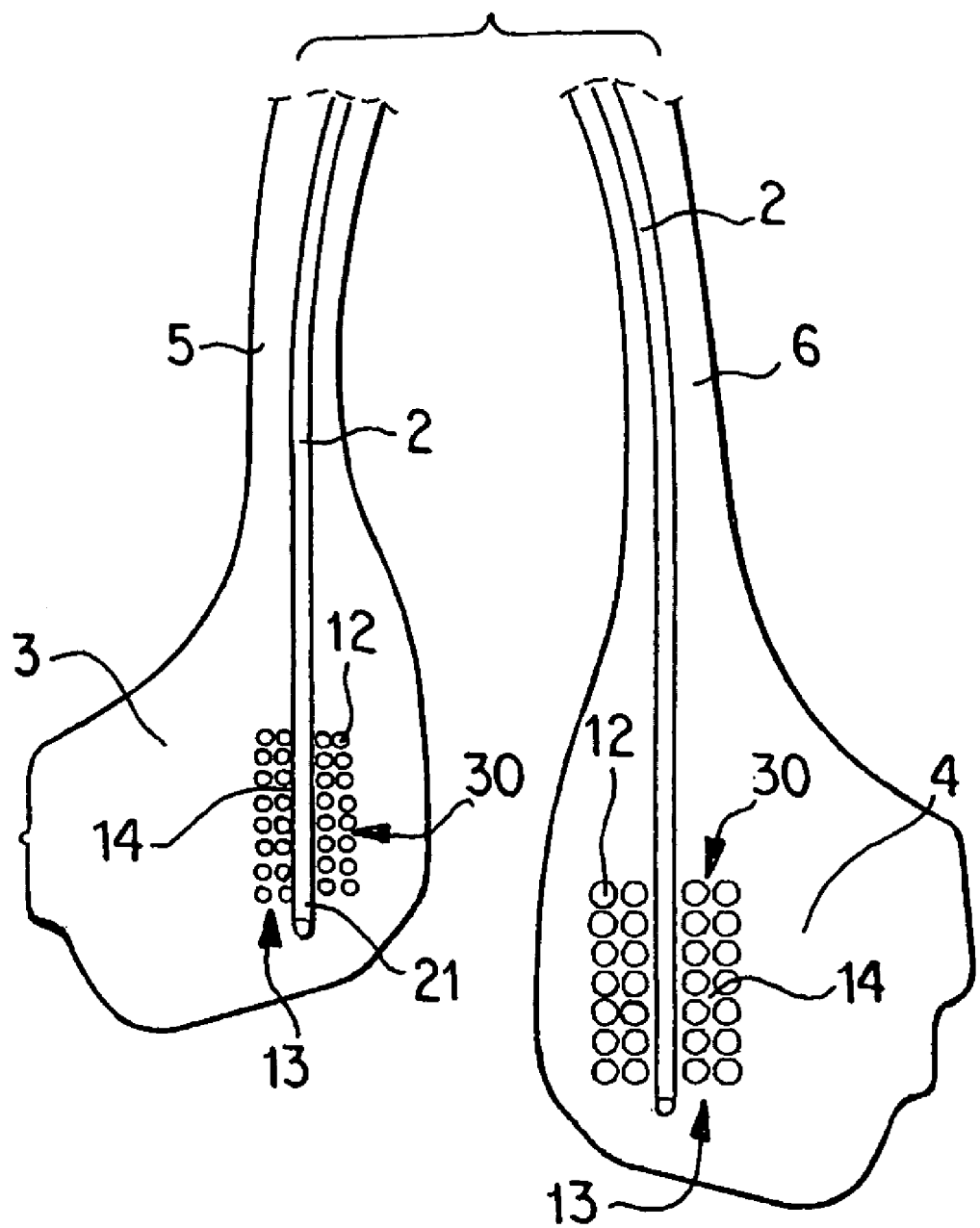
FIG. 6 shows, in an enlarged cross-section, the beads of the example of embodiment of FIG. 5.
Figure 7:
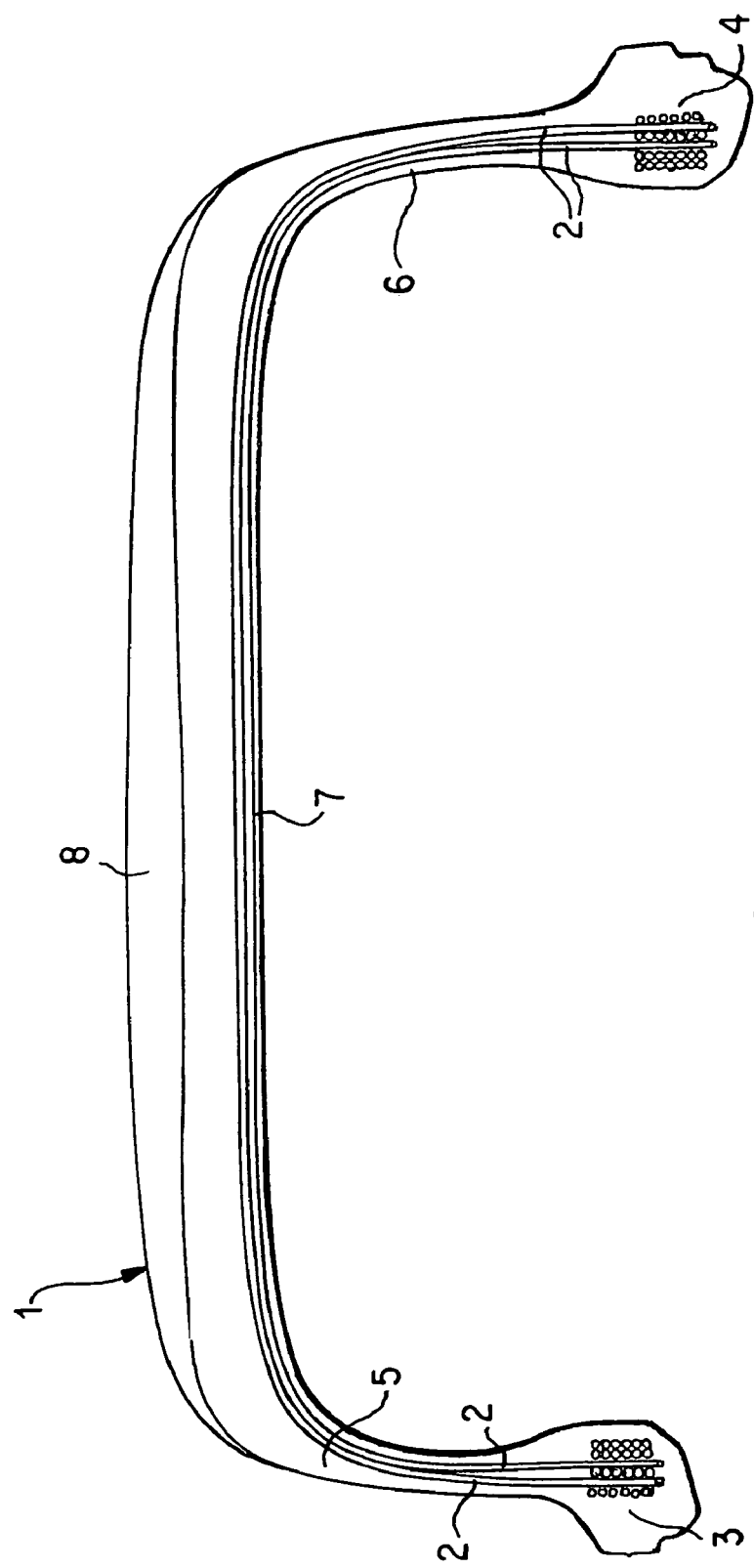
FIG. 7 shows, in cross-section, another example of embodiment of a tyre according to the invention.
Figure 8:
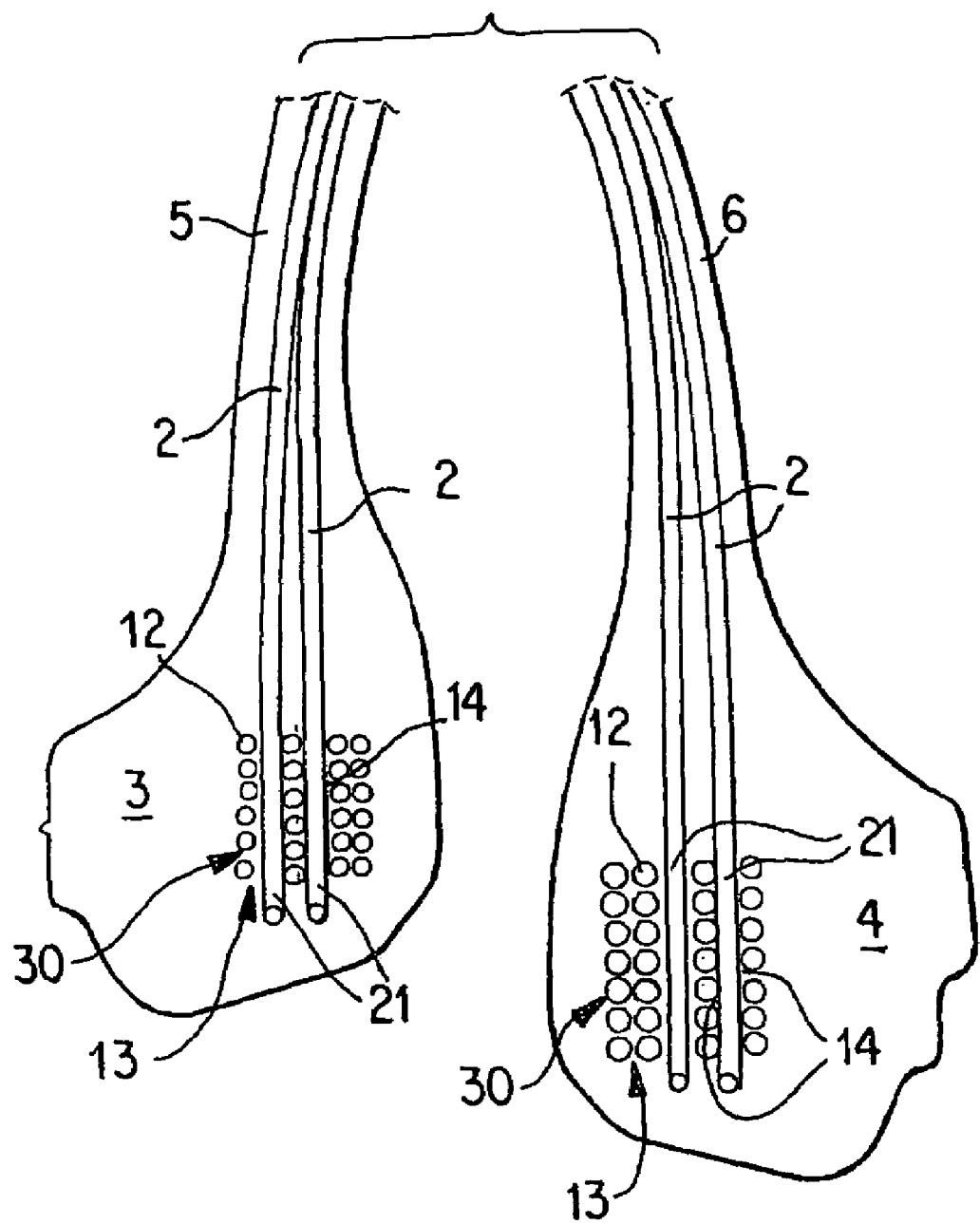
FIG. 8 shows, in an enlarged cross-section, the beads of the example of embodiment of FIG. 7.

According to a second embodiment, illustrated in FIGS. 3 and 4, the asymmetry of the beads 3 and 4 originates in particular from the fact that the number of stacks 13 is not identical in the two beads. By way of example, bead 3 has a stack 13 of cords 12 on each side of the structure 21, whereas the bead 4 has two stacks on each side of the structure 21. Obviously, the number of stacks could also be asymmetrical in a single bead. The differences between the number of stacks between each of the two beads could, moreover, also be greater.

Advantageously, the differences between the number of stacks of one bead relative to the other fulfil the following relationship: $\Sigma(Ee \times Se)ext > \Sigma(Ei \times Si)int$, in which $Ei$ represents the Young's modulus of the circumferential cords arranged in the bead of the axially inner side of the tyre or of the shorter sidewall; $Si$ represents the surface area of the cords arranged in the bead of the axially inner side of the tyre or of the shorter sidewall; $Ee$ represents the Young's modulus of the circumferential cords arranged in the bead of the axially outer side of the tyre or of the longer sidewall; $Se$ represents the surface area of the cords arranged in the bead of the axially outer side of the tyre or of the longer sidewall. In this manner, the resultant rigidity of the longer sidewall, preferably on the outer side, is greater than the resultant rigidity of the shorter sidewall, preferably on the inner side, so bringing about a greater anchoring capacity or force on the external side than on the internal side.

FIGS. 5 to 10 illustrate examples of another form of embodiment of a tyre according to the invention. In this form of embodiment, each of the beads 3 and 4 comprises arrangements 11 of cords 12 of different characteristics. The characteristic which varies may be the nature or material of the cords, the dimensions and/or profile of the cords etc. In the Examples illustrated in FIGS. 5 to 10, the disposition of the cords of said arrangements is such that the density per unit surface area of the cords 12 arranged in the external bead is greater than the density per unit surface area of the cords 12 arranged in the internal bead. According to an advantageous example, the density per unit surface area corresponds to the sum of the surface areas of the cord profiles (cut cords or filaments or cables or plied yarns). For example, a restricted number of cords of large diameter may occupy a larger surface area than a larger number of cords or cables or filaments or twisted yarns, etc, of generally smaller diameters. The sum of the surface areas is important: it may be a sum of identical or non-identical surface areas.

Figure 9:
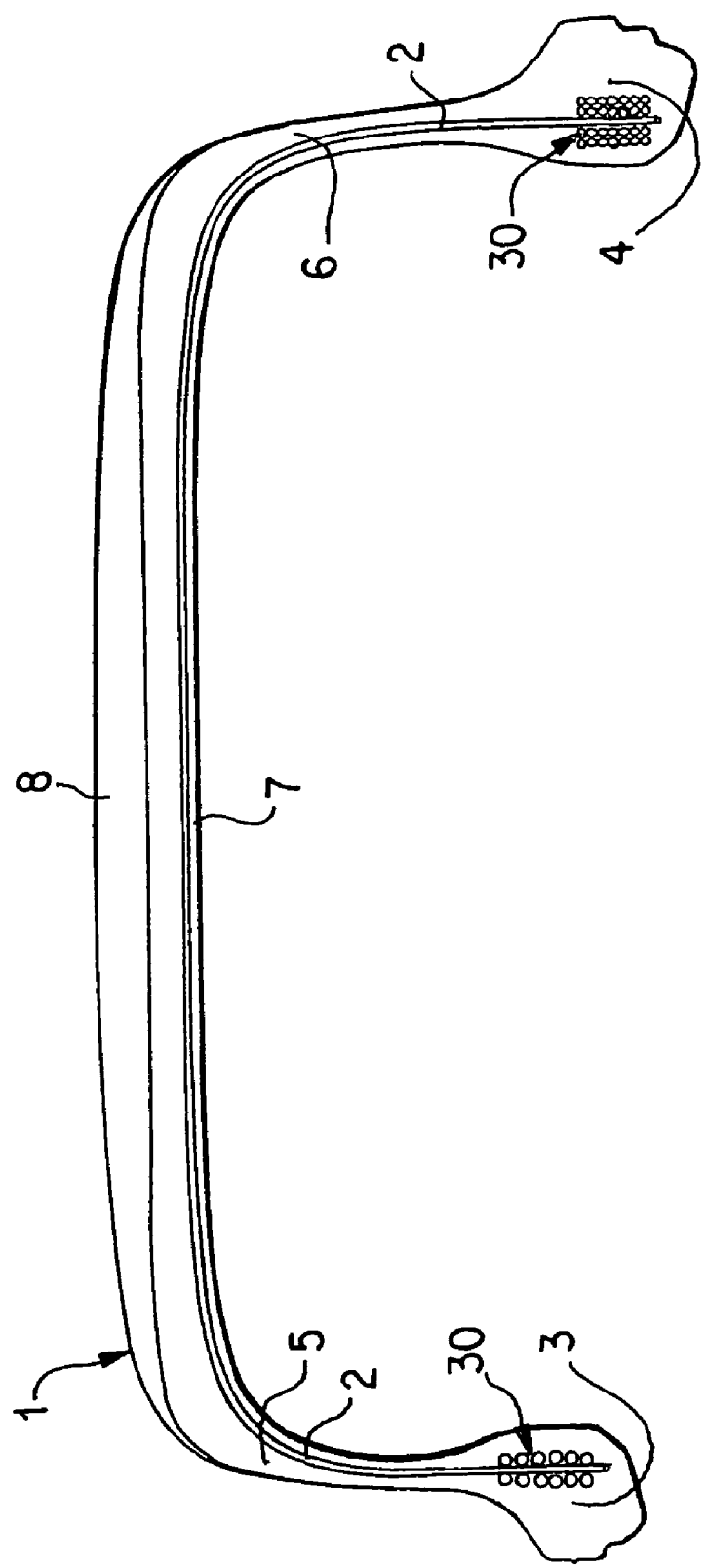
FIG. 9 shows, in cross-section, another example of embodiment of a tyre according to the invention.
Figure 10:
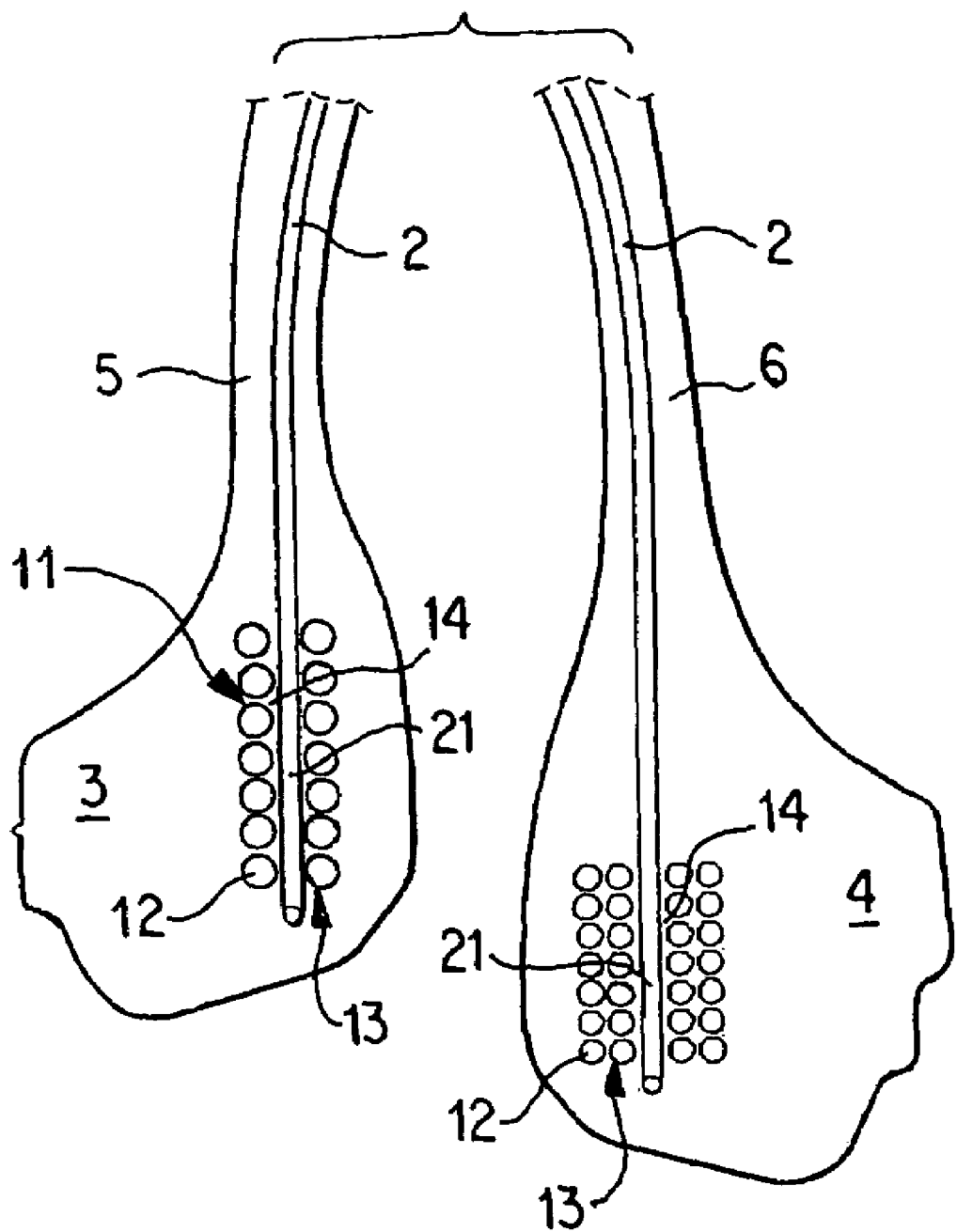
FIG. 10 shows, in an enlarged cross-section, the beads of the example of embodiment of FIG. 9.

Obviously, as is illustrated by FIGS. 9 and 10, various combinations of the above-described types of asymmetry may be used. Thus, in FIGS. 9 and 10, it is the number of stacks and the characteristics of the circumferential cords which vary.

The tyre according to the invention is particularly suitable for use on a rim of the type described in EP 0 673 324. Such a rim comprises a seat and preferably a raised area or flange located axially and radially towards the outside.

The bases of the stacks (the cords radially closest to the axis of rotation of the tyre) are preferably arranged radially farther to the outside than the end of said flange (axially and radially outermost portion of said flange), as illustrated, for example, in FIG. 3. The bases of the stacks are advantageously provided so as to be arranged radially externally relative to the flange of the rim 60 (or rim hook) which is matched to the tyre. Fitting/removal operations are then facilitated. Thus, in FIG. 2, it will be seen that $r_f$ (radius of the first cords) is greater than $r_j$ (radius of the rim flange or hook). This radius corresponds to the distance from the axis of rotation.

The different examples of embodiment described and/or illustrated may advantageously be produced using devices of the types described in EP 0 580 055.

Thus, for example, it is very advantageous to build the tyre on a central core which imparts the shape of its internal cavity. There are applied to this core, preferably in the order required by the final architecture, all the constituents of the tyre, which are arranged directly in their final position, in a substantially final profile. In this case, such a tyre can be moulded and vulcanised as set forth in U.S. Pat. No. 4,895,692.

The invention claimed is:

1. A tyre for a vehicle wheel, comprising:
   two sidewalls spaced apart axially from each other, joined at their radially outer portions by a crown zone provided on its radially outer portion with a circumferential tread, the sidewalls being of different respective heights;
   beads, arranged radially to the inside of each of the sidewalls, each bead comprising a seat and an outer flange which are intended to come into contact with a suitable rim;

a reinforcement structure extending substantially radially from each of the beads, along the sidewalls, towards the crown zone;

each of said beads comprising:
- a bead seat comprising a generatrix, the axially inner end of which lies on a circle of diameter greater than the diameter of the circle on which the axially outer end is located;
- an anchoring zone for the reinforcement structure in said bead, comprising an arrangement of circumferential cords disposed substantially adjacently to a portion of the reinforcement structure and comprising at least two stacks of cords distributed on respective axially inner and outer sides of the portion of the reinforcement structure wherein all said cords located on the axially inner side of the reinforcement structure are disposed axially inwardly of all said cords located on the axially outer side of the reinforcement structure, a bonding compound being provided between the circumferential cords and the reinforcement structure;
- a bearing zone for said bead extending substantially along the seat of the latter;
- each of the beads comprising a specific and distinct arrangement of the anchoring zone thereof, such that the anchoring zone of the bead corresponding to a sidewall of greater height exhibits a greater anchoring capacity than the anchoring zone of the bead corresponding to a sidewall of lesser height and both anchoring zones are arranged in such a manner as to produce a rim clamping load which is substantially identical on each side when the tyre is fitted on an appropriate rim and pressurised to a pressure substantially corresponding to its operating pressure, and each circumferential cord arranged in the bead of the sidewall of lesser height exhibits a Young's modulus $E_i$ and a surface area $S_i$ and each cord arranged in the bead of the longer sidewall exhibits a Young's modulus $E_e$ and a surface area $S_e$, the cords of said arrangements being disposed such that $\Sigma(E_e \times S_e)_{ext} > \Sigma(E_i \times S_i)_{int}$.

2. The tyre of claim 1, in which the sum of the products E×S is considered solely in the bead zones of the tyre.

3. The tyre of claim 1, in which the number of circumferential cords of the anchoring zone of the bead of the sidewall of greater height is greater than the number of circumferential cords of the anchoring zone of the sidewall of lesser height.

4. The tyre of claim 1, in which the number of stacks of circumferential cords of the anchoring zone of the sidewall of greater height is greater than the number of stacks of circumferential cords of the anchoring zone of the sidewall of lesser height.

5. The tyre of claim 1, in which at least one characteristic of the circumferential cords of the anchoring zone of the sidewall of greater height differs from the characteristics of the circumferential cords of the anchoring zone of the sidewall of lesser height.

6. The tyre of claim 1, in which said anchoring zone of the sidewall of greater height is arranged in said bead in such a manner that, at normal pressure, the forces of the reinforcement structure are distributed substantially homogeneously on either side of said structure in said anchoring zone.

7. The tyre of claim 1, in which the sidewall of lesser height is intended to be positioned towards the interior side of a vehicle and the sidewall of greater height is intended to be positioned towards the exterior side of a vehicle.

* * * * *